United States Patent [19]
Sukup

[11] Patent Number: 5,682,829
[45] Date of Patent: Nov. 4, 1997

[54] APPARATUS FOR INJECTING LIQUID MANURE INTO THE SOIL

[75] Inventor: Eugene G. Sukup, Hampton, Iowa

[73] Assignee: Sukup Manufacturing Company, Sheffield, Iowa

[21] Appl. No.: 658,470

[22] Filed: Jun. 5, 1996

[51] Int. Cl.⁶ ................................................. A01C 23/02
[52] U.S. Cl. ........................................ 111/121; 111/137
[58] Field of Search ............................... 111/52, 186, 118, 111/120, 121, 130, 924, 137; 172/142, 146, 172, 200, 177, 558

[56] References Cited

U.S. PATENT DOCUMENTS

| | | |
|---|---|---|
| 1,062,169 | 5/1913 | La Rue . |
| 2,988,025 | 6/1961 | Johnston . |
| 3,793,967 | 2/1974 | Van Den Berg . |
| 3,926,131 | 12/1975 | Collins . |
| 4,014,271 | 3/1977 | Rohlf et al. . |
| 4,056,226 | 11/1977 | Hodgson . |
| 4,145,980 | 3/1979 | Boots ................................. 111/100 |
| 4,186,671 | 2/1980 | Huang . |
| 4,402,648 | 9/1983 | Kretschmer ........................ 415/121 B |
| 4,624,197 | 11/1986 | Drake .................................... 111/52 |
| 4,995,325 | 2/1991 | Herriau et al. .................... 111/137 X |
| 5,074,227 | 12/1991 | Schwitters ........................... 111/137 |
| 5,235,922 | 8/1993 | Deckler ................................ 111/137 |
| 5,269,380 | 12/1993 | Lofquist et al. ..................... 172/558 |

Primary Examiner—Terry Lee Melius
Assistant Examiner—Robert Pezzuto
Attorney, Agent, or Firm—Zarley, McKee, Thomte, Voorhees & Sease

[57] ABSTRACT

A combination of a wheel supported liquid manure tank having a rearward end and a liquid manure soil injection device secured to the rearward end. The injection device is mounted on the rearward end of the tank and is capable of being raised and lowered by hydraulic cylinders. A plurality of substantially parallel support arms extend rearwardly from the tank and have a disk rotatably supported intermediate the ends thereof. The disk is mounted at an oblique angle with respect to the forward line of travel of the tank, that is, the disk is inclined laterally from a vertical plane approximately 2 degrees and is skewed with respect to the line of travel approximately 5 degrees. The disk is adapted when engaging the soil to open a slit therein. A nozzle operatively connected to the tank has its lower end disposed immediately above the slit. A cleaning knife is secured to the nozzle adjacent the disk on one side thereof to engage the disk and remove particles of earth which might adhere to the disk. A rubber cleaning wheel with a lip thereon engages the opposite side of the disk for the same purpose. That wheel also extends rearwardly from the tank. A closure wheel is mounted on the rearward end of the support arm to rotate over the open slit to close the same.

28 Claims, 8 Drawing Sheets

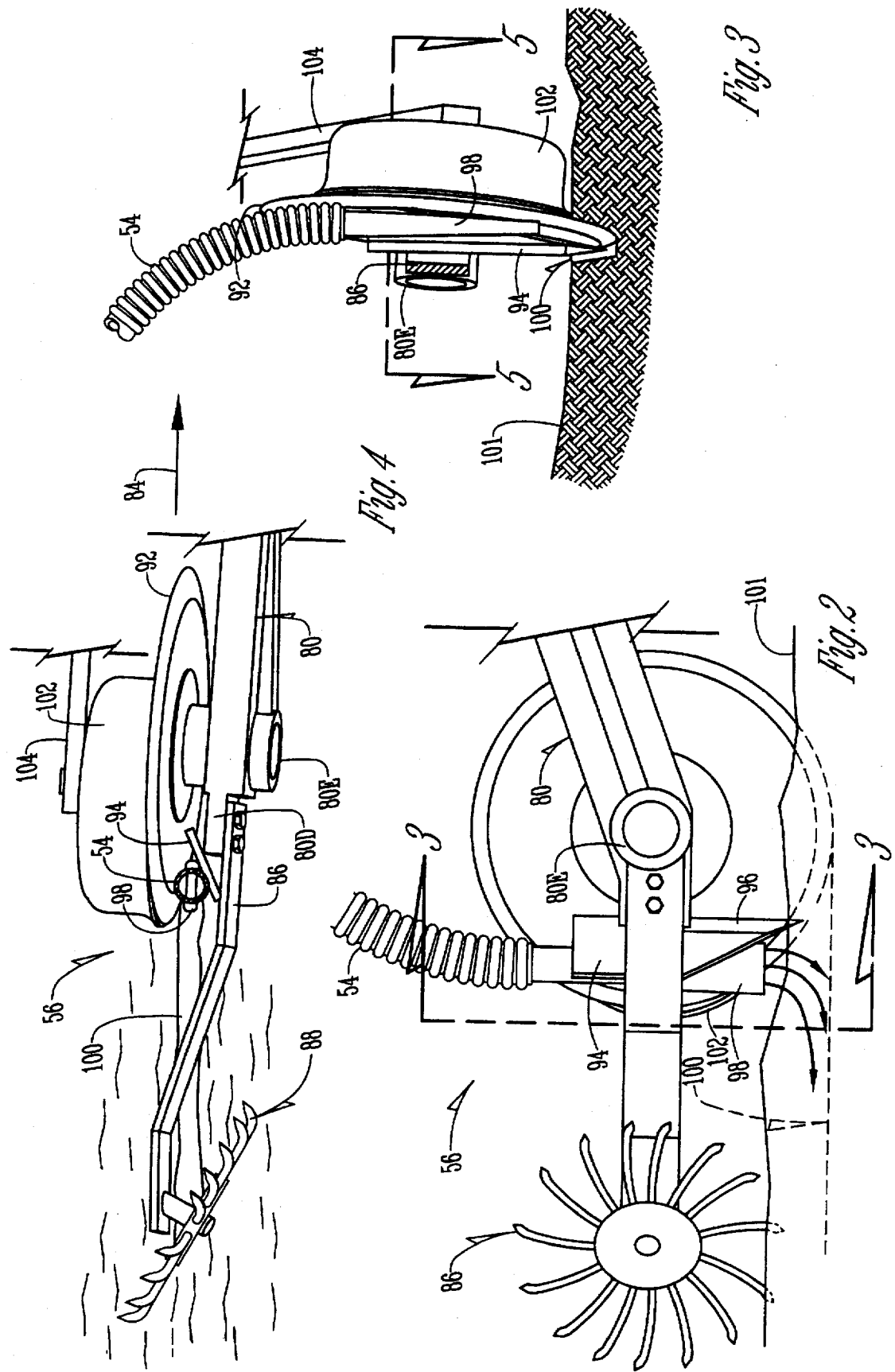

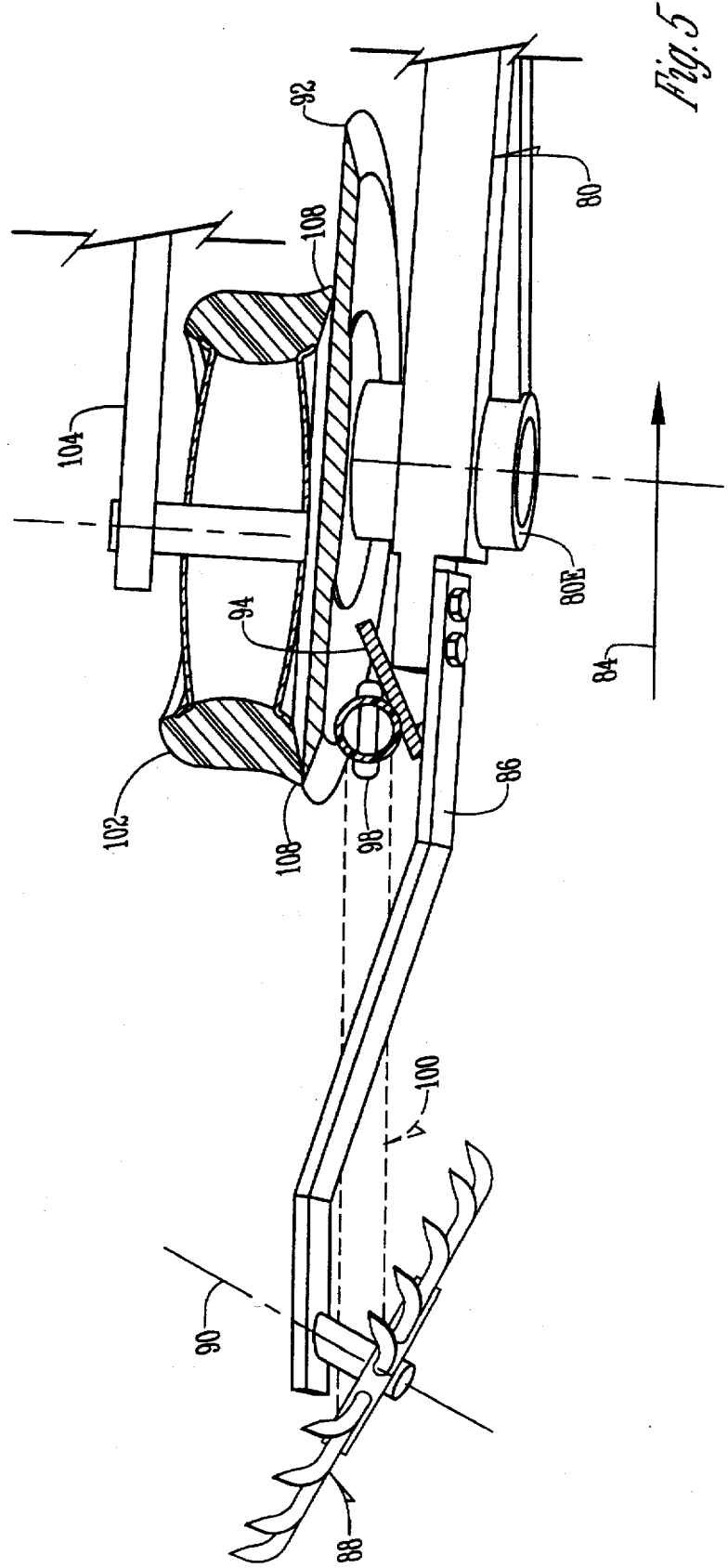

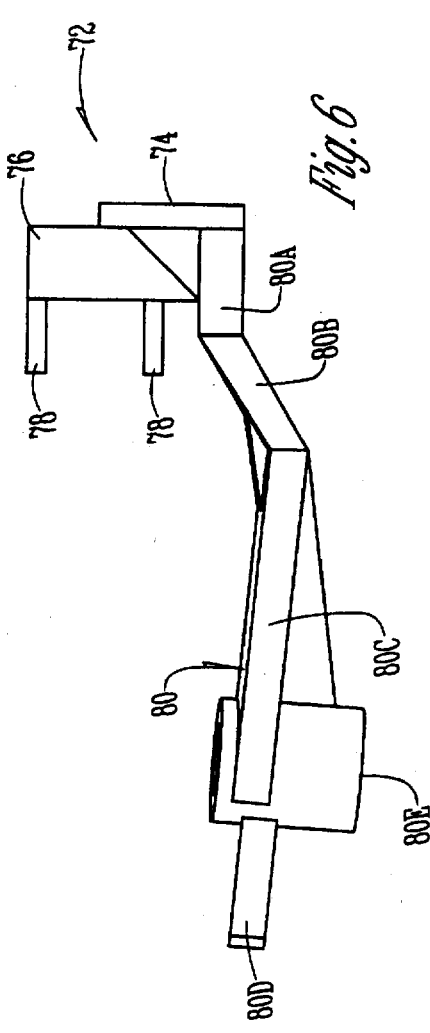
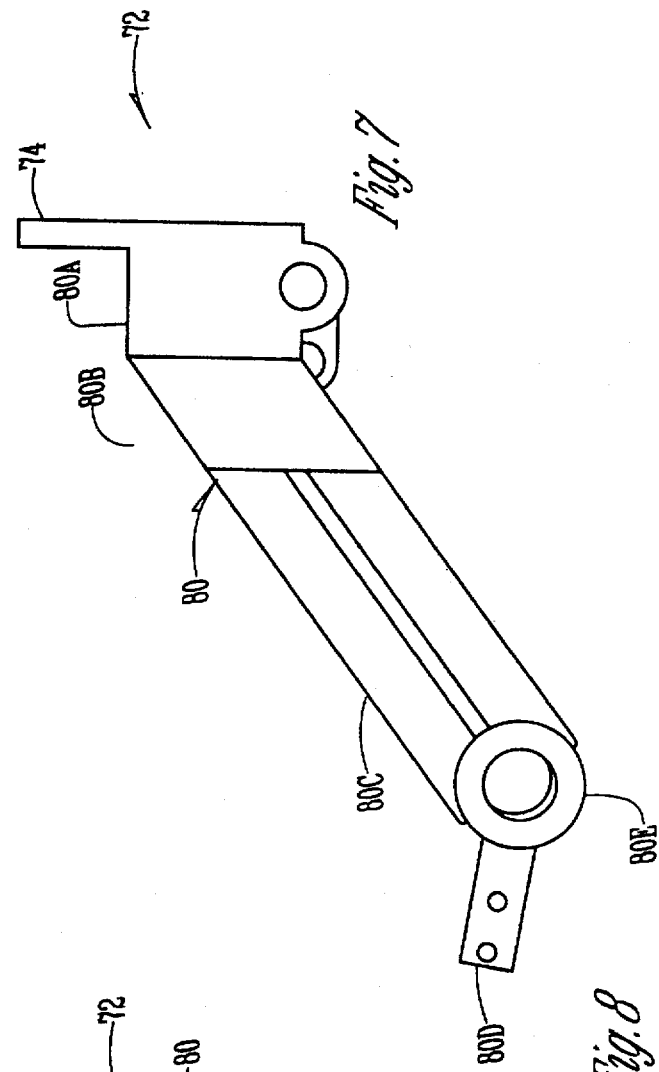
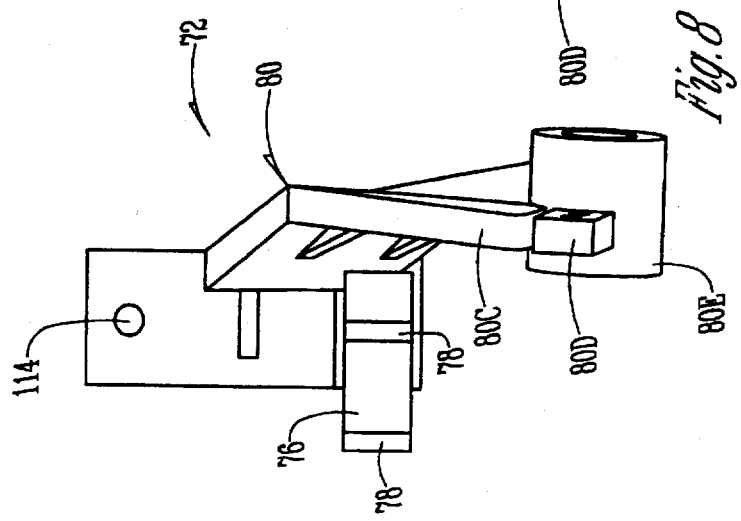

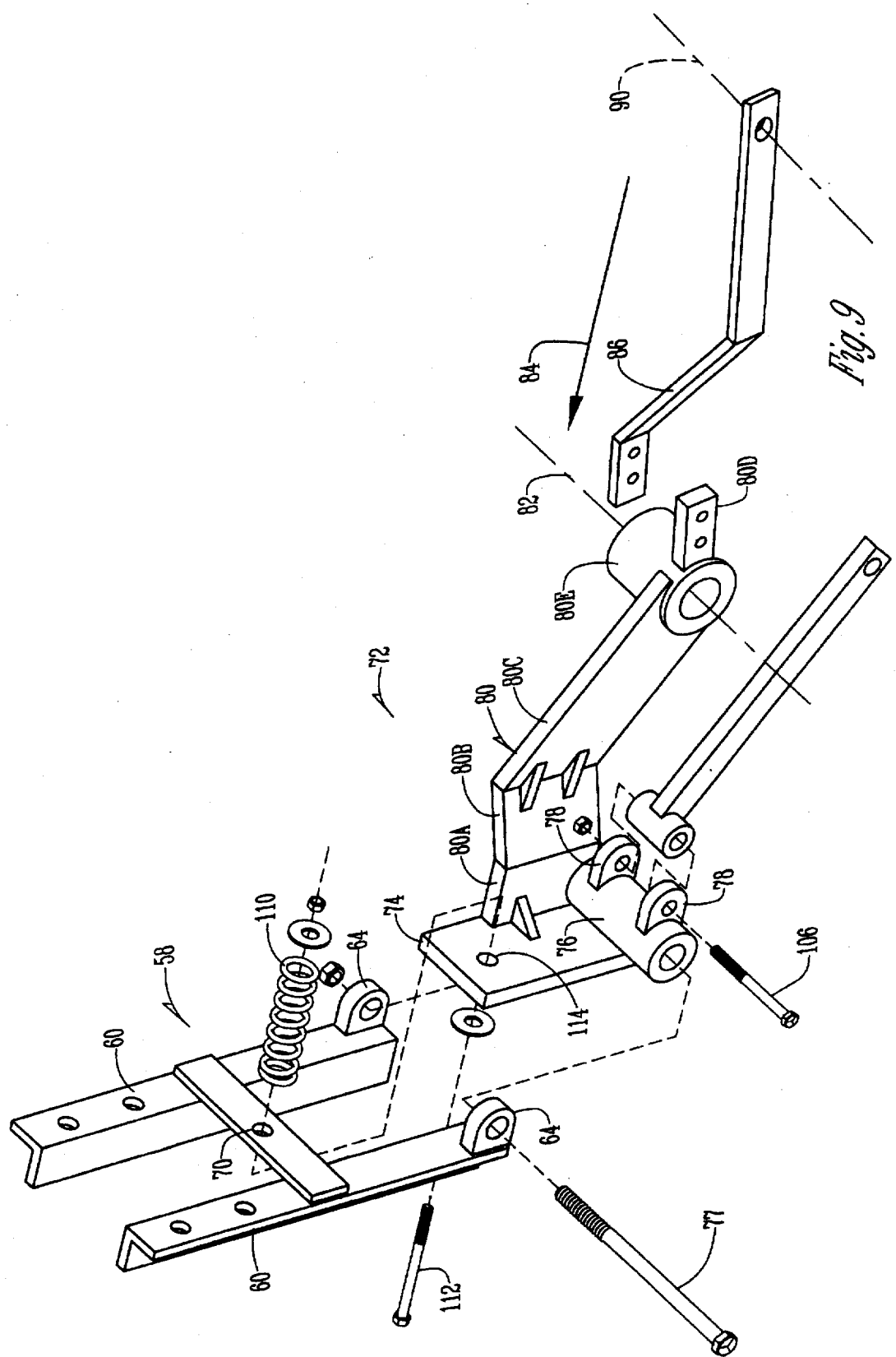

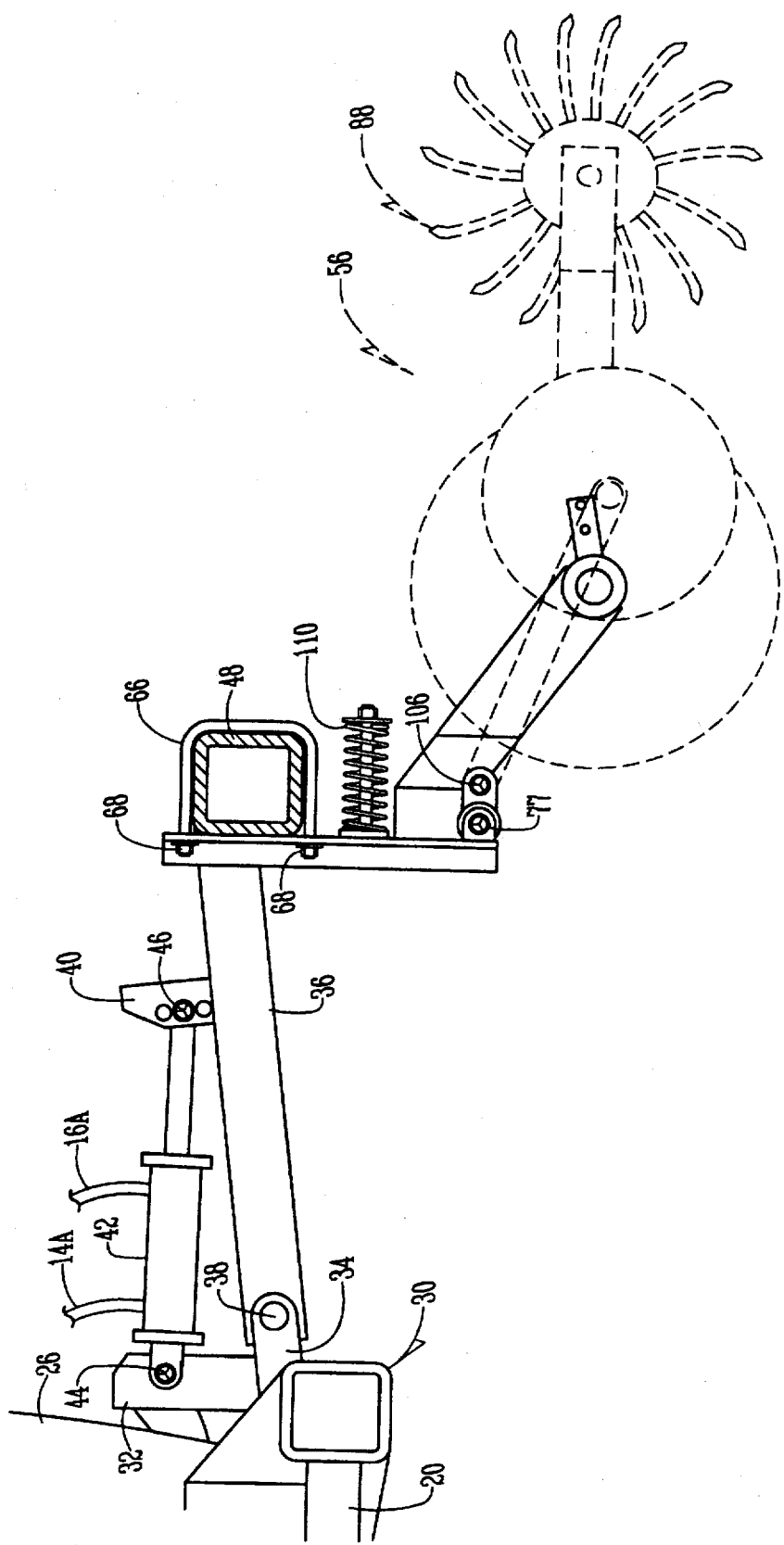

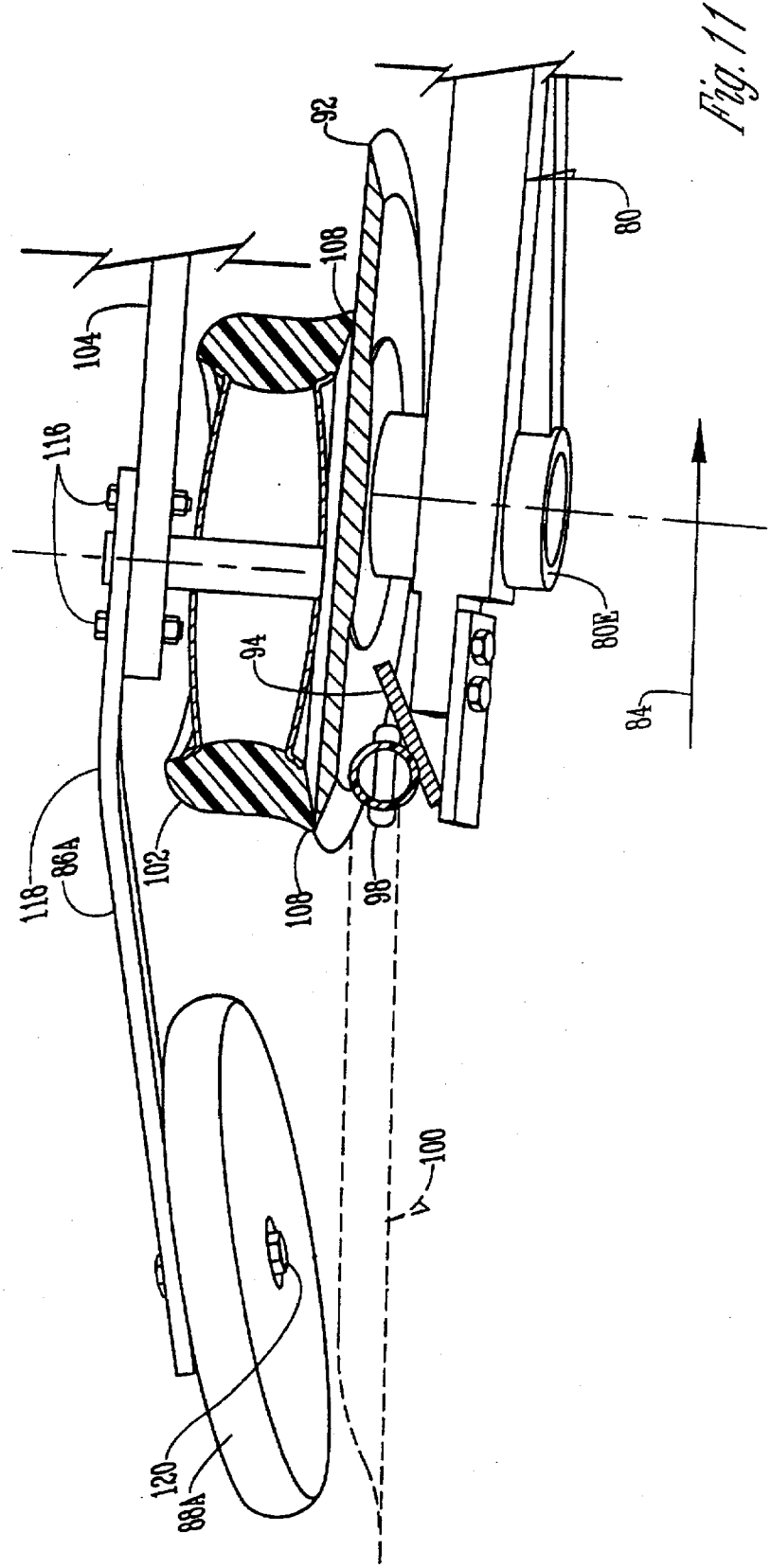

5,682,829

APPARATUS FOR INJECTING LIQUID MANURE INTO THE SOIL

BACKGROUND OF THE INVENTION

Liquid manure from livestock and poultry confinement buildings is commonly collected in pits and lagoons. It ultimately must be disposed of, and is typically carried by large tank trucks or wagons, and spread on crop or pasture ground to utilize the fertilizer value of the material.

The liquid manure carries an unpleasant odor, and spraying it on the ground surface allows the odor to permeate the surrounding area. Some attempts have been made to inject the manure into the ground by knives or the like mounted on the wagons or trucks, but this also has proven unsatisfactory because some of the material remains on top of the ground, and the liquid tends to flow longitudinally along the slit in the ground created by the knives when uneven terrain is encountered. Further, runoff of the material into ditches and streams often occurs.

It is therefore a principal object of this invention to dispose of liquid manure without subjecting the area of disposal to the odor of the manure.

A further object of the invention is to bring the material in slits in the soil so that runoff is prevented.

A further object of the invention is to bury the material in slits in the soil so that runoff is prevented.

A further object of the invention is to permit the material to be quickly and efficiently disposed of without interference from solids in the material.

These and other objects will be apparent to those skilled in the art.

SUMMARY OF THE INVENTION

A combination of a wheel supported liquid manure tank having a rearward end and a liquid manure soil injection device secured to the rearward end. The injection device is mounted on the rearward end of the tank and is capable of being raised and lowered by hydraulic cylinders. A plurality of substantially parallel support arms extend rearwardly from the tank and have a disk rotatably supported intermediate the ends thereof. The disk is mounted at an oblique angle with respect to the forward line of travel of the tank, that is, the disk is inclined laterally from a vertical plane approximately 2 degrees and is skewed with respect to the line of travel approximately 5 degrees. The disk is adapted when engaging the soil to open a slit therein. A nozzle operatively connected to the tank has its lower end disposed immediately above the slit. A cleaning knife is secured to the nozzle adjacent the disk on one side thereof to engage the disk and remove particles of earth which might adhere to the disk. A rubber cleaning wheel with a lip thereon engages the opposite side of the disk for the same purpose. That wheel also extends rearwardly from the tank. A closure wheel is mounted on the rearward end of the support arm to rotate over the open slit to close the same.

BRIEF DESCRIPTION OF THE DRAWINGS

FIG. 2 is a large scale side elevational view of the injection assembly;

FIG. 3 is a partial sectional view taken on line 3—3 of FIG. 4;

FIG. 4 is a top plan view of the structure shown in FIG. 2;

FIG. 5 is an enlarged scale partial sectional view taken on line 5—5 of FIG. 3;

FIG. 6 is a small scale plan view of one of the support arms;

FIG. 7 is a side elevational view of the structure of FIG. 6 as viewed from the bottom thereof;

FIG. 8 is a rear view of the structure of FIG. 7 as seen from the left hand side thereof;

FIG. 9 is an exploded perspective view of the support arm and related structure;

FIG. 10 is an enlarged scale side elevational view of the injection assembly shown at the right-hand end of FIG. 1;

FIG. 11 is a view of an alternate embodiment of the invention similar to that of FIG. 5;

DESCRIPTION OF THE PREFERRED EMBODIMENT

Figure 1:
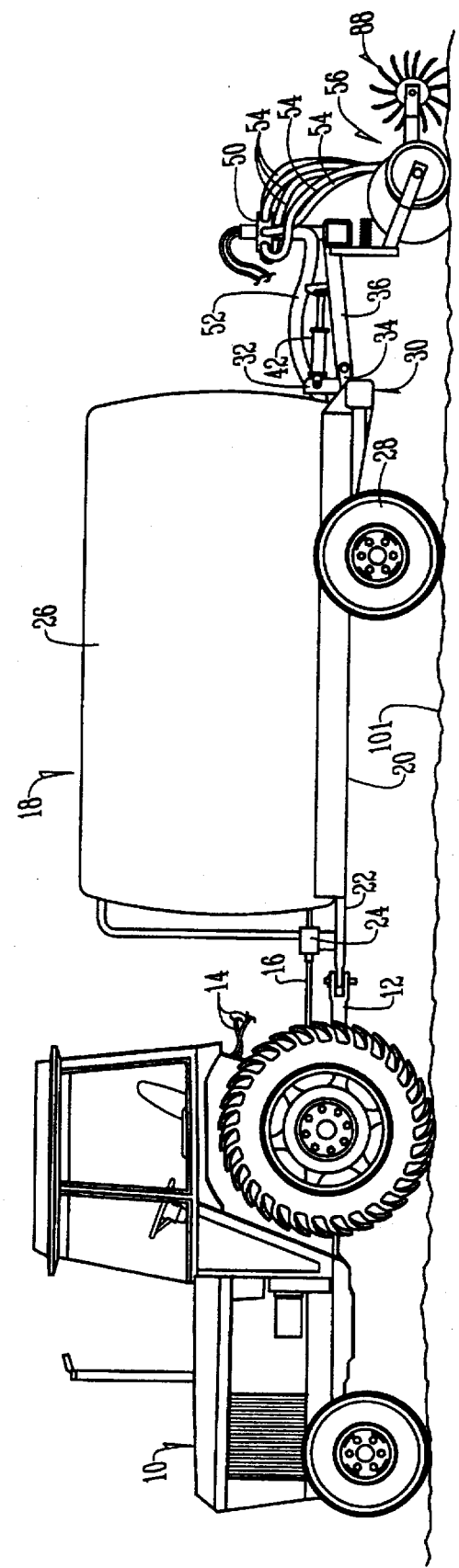
FIG. 1 is a side elevational view of the device of this invention attached to the rearward end of a liquid manure tank which in turn is secured to a conventional farm tractor.

With reference to FIG. 1, a conventional farm tractor 10 has a rearward draw bar 12 and at least a pair of conventional hydraulic hoses 14 connected to a hydraulic pump (not shown) within the tractor. Tractor 10 also has a rearwardly extending power takeoff shaft 16 to provide rotational power.

A liquid manure wagon or spreader 18 has a horizontal frame 20 and a forwardly extending tongue 22. A conventional hydraulic pump 24 is secured to tongue 22 and is operationally connected and driven by shaft 16. A cylindrical tank 26 is mounted on frame 20 and is conventionally and operatively connected to pump 24 so that liquid can be pulled into the tank in one mode of operation, and placed under pressure in another mode of operation for spreading or injection. Wheels 28 support the frame 20. The structure described heretofore is entirely conventional and does not comprise the essence of this invention.

Wagon 18 has a rear frame 30 (FIGS. 1 and 10) to which upstanding cylinder clevice arms 32 are secured. As best shown in FIG. 10, clevice arms 34 are welded to frame 30 and extend rearwardly and pivotally support rearwardly extending toolbar arms 36 by means of pins 38 which extend through the arms 36 and clevice arms 34. An upstanding piston rod plate 40 (FIG. 10) is welded to the upper rearward surface of arms 36. One or more conventional hydraulic cylinders 42 are supported between clevice arm 32 and piston rod plate 40 by pins 44 and 46, respectively. The rearward ends of arms 36 are welded to toolbar 48.

A hydraulically operated chopper pump 50 (e.g. Farm Star pump Model 1680, manufactured by Farm Star at Washington, Iowa) extends upwardly from and is rigidly secured to toolbar 48. (FIG. 1). It is operated by a connection of hydraulic hoses 14 and 16 thereto. A large fluid conduit 52 extends from tank 26 to the pump 50. A plurality of smaller outlet fluid conduits 54 extend from pump 50 to injection nozzles which will be discussed hereafter.

A fluid injection assembly 56 (FIGS. 1 and 10) includes the support bracket 58 (FIG. 9). Bracket 58 includes a pair of vertically spaced parallel angle irons 60 with horizontal bar 62 welded thereto. A pair of apertured ears 64 extend rearwardly from the lower ends of members 60. A pair of conventional U-shaped bolts 10 embrace toolbar 48 and are secured to support bracket 58 by bolts 68. (FIG. 10). A hole 70 (FIG. 9) appears in the center of the bar 62 of support bracket 58.

It should be understood that a plurality of support brackets 58 and assemblies 56 are typically secured to the toolbar 48 to provide separate laterally spaced injection stations. To each support bracket is secured a rearwardly extending support arm 72 which is of cast construction. Arms 72 have left and right hand versions which are mirror images of each other. Arms 72 shown in FIGS. 6–8 are located to the left of the center line of travel at tractor 10. Each arm 72 is comprised of a vertical plate portion 74 which has horizontal bushing portion 76 at its lower edge. A horizontal pin 77 (FIG. 9) pivotally secures the support arm 72 to the support bracket 58 by extending through the spaced ears 64 and the bore in bushing portion 76. A pair of rearwardly extending ears 78 with suitable apertures therein are cast with the arm 72.

Arm portion 80 of support arm 72 includes a rearwardly extending straight portion 80A, a first bent portion 80B, a reverse bent portion 80C, a rearwardly extending plate portion 80D, and a disk hub 80E. Hub 80E has an axis of rotation 82 which forms a slight angle with the line of travel of the tank as shown by the arrow 84 in FIG. 9. Stated differently, the angle between arrow 84 and the plane of arm portion 80C is approximately 5 degrees. Further, the rotational axis 82 of hub 80E is tilted slightly to form an angle of approximately 2 degrees with respect to a horizontal axis. This angle is also created by the geometry formed in support arm 80.

A trailing wheel bracket 86 is bolted or otherwise secured to the rearward end of rear plate portion 80D. Suitable bends in bracket 86 permit cover wheel 88 rotatably secured to the rearward end thereof to have an axis of rotation 90 which is at an angle with respect to the forward line of travel 84 sufficient to closes the slit into which the liquid manure is injected as will be discussed hereafter. As can be seen in FIG. 5, the axis of rotation of cover wheel 88 is directly over the slit 100 (to be discussed hereafter) so as to agitate the soil on opposite sides of the slit 100. The wheel 88 is comprised of a series of radially extending teeth typical of those wheels used on rotary hoes and is effective in closing the slit 100.

Disk 92 is mounted on hub 80E, and by reason of the geometry and the length of the previously described arm portion 80 forms an angle of 5 degrees with respect to the forward line of travel 84 (FIGS. 4 and 5). A cleaning knife 94 is welded at an angle between the trailing wheel bracket 86 and the end of the rear plate portion 80D of arm portion 80 (FIG. 5). Cleaning knife 94 has a forward lower edge 96 which bears against one side of disk 92 to clean any residue of soil or the like which may adhere to that side of the disk (FIG. 2). A stainless steel nozzle 98 is welded or otherwise secured to one side of knife 94 immediately over the slit 100 which is formed in the soil by disk 92. The lower end of nozzle 98 is flattened from a cylindrical shape so as to better confine the fluid therefrom into the slit 100 which is approximately 1½ inches wide. The bottom end of nozzle 98 typically terminates slightly above the ground level 101 (FIG. 2). Nozzles 98 are connected to chopper pump 50 by conduits 54.

Ground wheel 102 is rotatably secured to the rearward end of arm 104 which in turn is pivotally secured by pin 106 to the rearwardly extending ears 78 which protrude from bushing 76 (FIG. 9). Ground wheel 108 is comprised of rubber or the like and has an outwardly extending lip 108 which engages the side of disk 92 opposite to cleaning knife 94 so as to also clear any debris of soil or the like which adheres to that side of the disk during operation. The structure of ground wheel 102 has been previously used with disks associated with corn and bean planters and does not of itself comprise a part of this invention.

A spring 110 has a bolt 112 extending therethrough. The forward end of the bolt extends through hole 114 in plate 74 and also through the aperture or opening 70 in bar 62 (FIG. 9). Spring 110 is in a neutral state of compression as viewed in FIG. 10. If disk 92 engages an obstruction in the soil, disk 92 will rise with arm 72 causing spring 110 to operatively compress as plate 74 and arm 72 rotate clockwise (FIG. 10) about pin 77.

In operation, cylinder 42 is actuated from the tractor 10 via hydraulic hoses 14A or 16A to a retracted position to raise the assembly 56 upwardly out of engagement with the ground. The wagon 18 is taken to a point adjacent a pit or lagoon where a suction hose has one end immersed in the pit of liquid manure and the other end operatively connected to a port (not shown) on tank 26. PTO shaft 16 is thereupon actuated to operate pump 24 which is then in a suction mode. Liquid manure is sucked into tank 26. When the tank 26 is filled, the PTO shaft 16 is disengaged, and the wagon 18 is towed to the field in which the liquid manure in the tank is to be injected.

Upon entering the field, the cylinder 42 is again actuated from the tractor through hydraulic hoses 14A or 16A so that the cylinder is extended to lower the assembly 66 to the ground surface whereupon the disk 92 slightly penetrates the ground. The pump 24 is then changed to its discharge mode and the PTO shaft is engaged to cause liquid manure to flow from the tank 26 through the fluid conduit 52 into the chopper pump 50. The wagon 18 is then driven through the field and the disks on assembly 56 begin to create a plurality of elongated parallel slits 100. A quantity of liquid manure is discharged from pump 50 through the various conduits 54 into the various nozzles 98. The cover wheel 88 thereupon closes the slit 100 after the liquid manure is injected therein so that the liquid manure has very little exposure to the atmosphere.

The cleaning knife 94 serves to clean one side of the disk 92 and the ground wheel 102 serves to clean the other side of the disk, all as explained heretofore.

DESCRIPTION OF AN ALTERNATE EMBODIMENT OF THE INVENTION

Figure 12:
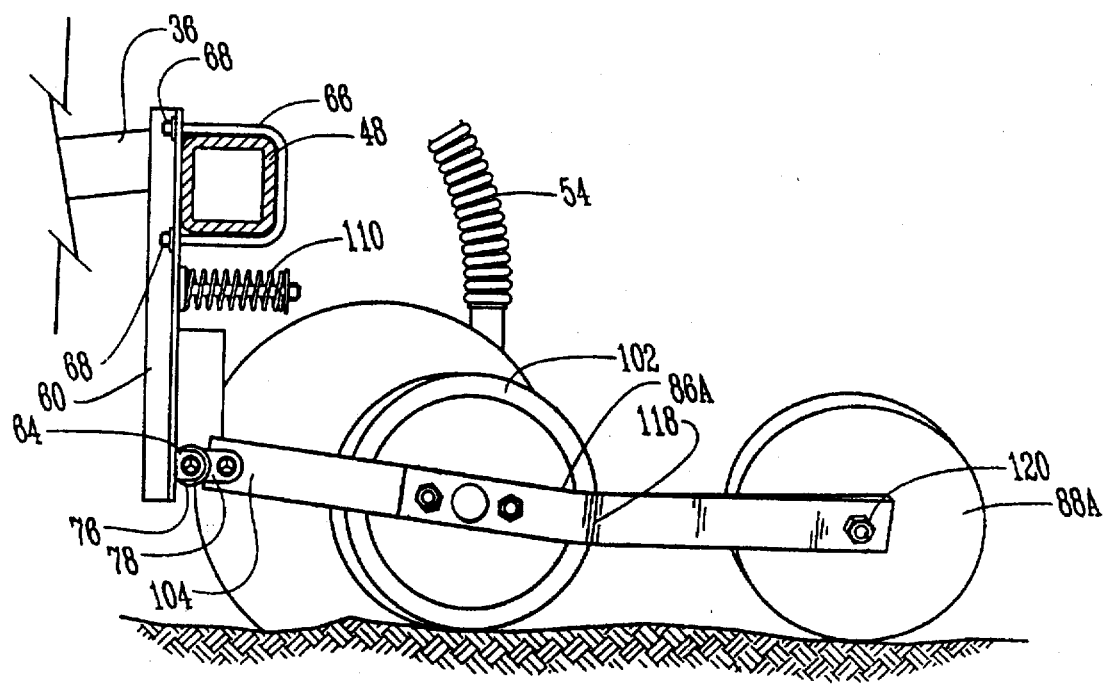
FIG. 12 is a smaller scale side elevational view as seen from the top of FIG. 11.
Figure 13:
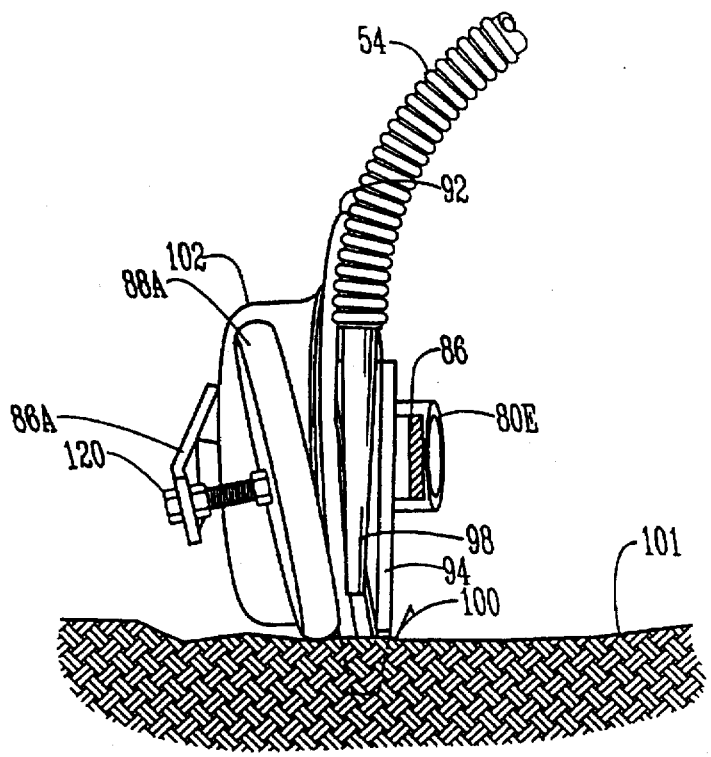
FIG. 13 is a rear view the righthand side of FIG. 12.

With respect to FIGS. 11–13, an alternate embodiment is shown. The arm 86 and closing wheel 88 of the device of FIGS. 1–10 are eliminated. An elongated rearwardly extending arm 86A has its forward end secured to arm 104 by bolts 116. Arm 86A is bent and twisted at 118 about six degrees with respect to a forward line of travel and about two degrees with respect to a vertical line. (See FIG. 13). A solid rubber or the like closing wheel 88A is rotatably connected to the rearward end of arm 86A by axle 128. The rounded perimeter 122 of wheel 88A engages the ground level 101 adjacent slit 100 and forces soil into the slit to close or seal the slit. See the narrowed slit at 100A in FIG. 11. Wheel 88A leans laterally about two degrees in a direction opposite to that of disk 92, and is at a six degree angle with respect to the forward travel of the device (i.e., line 84, FIG. 4)

The device of this invention permits the liquid manure to be easily and quickly deposited in the slits 100 which are quickly closed by the wheels 88 (or 88A) whereupon odors from manure escaping to the atmosphere are essentially eliminated. The quick closure of the slits 100 by the closure wheel 88 (or 88A) prevents the liquid manure from running laterally out of or longitudinally with respect to the slits. The chopper pump 50 disintegrates the solid material in the liquid manure so as to prevent the nozzles 98 from clogging. Essentially no run off and no odor results from the use of this invention.

It is therefore seen that this invention will achieve at least all of its stated objectives.

What is claimed is:

1. A liquid manure soil injection device, comprising, an elongated support arm having forward and rearward ends, attachment means on said forward end to secure said support arm to the rearward end of a liquid manure tank adapted to have a forward line of travel, a hub on said support arm intermediate the forward and rearward ends thereof, an earth cutting disk rotatably mounted on said hub, and having opposite side surfaces for movement through soil, said earth cutting disk having an axis of rotation which forms both a lateral and vertical angle with respect to said line of travel as to be obliquely positioned when moved forwardly to open an elongated slit in the soil in which said disk is moving, and a liquid outlet nozzle on the rearward end of said support arm and adapted for connection to said tank and being positioned rearwardly of said hub and adjacent said disk for delivery of liquid manure into the slit created in the soil by said disk.

2. The device of claim 1 wherein a cleaning knife is secured to the rearward end of said support arm and is positioned against one side of said disk to clean particles of soil from said disk that may adhere to said disk as said slit is being formed.

3. The device of claim 2 wherein a ground engaging wheel is positioned on the other side of said disk opposite to said cleaning knife and engaging said disk to clean particles of soil from said disk that may adhere to said disk as said slit is being formed.

4. The device of claim 3 wherein said wheel has an axis of rotation parallel to the axis of rotation of said disk.

5. The device of claim 3 wherein said wheel has an outer perimeter with a radially protruding lip, and said lip engages the other side of said disk.

6. The device of claim 1 wherein the axis of rotation of said disk is created by the position of said support arm with respect to said forward line of travel.

7. The device of claim 2 wherein said outlet nozzle is positioned adjacent said cleaning knife.

8. The device of claim 1 wherein a soil engaging closing wheel is secured to the rearward end of said support arm rearwardly of said disk and said nozzle to move soil into said slit as said device is moved in a forwardly direction.

9. The device of claim 1 wherein said attachment means includes a transversely positioned drawbar, a manure solids chopping pump mounted on said drawbar for connection to a liquid manure tank and said nozzle.

10. The device of claim 1 wherein a lifting means is connected to said drawbar to permit said device to be raised and lowered with respect to a tank to which it is attached.

11. The device of claim 1 wherein said manure soil injection device comprises a plurality of second support arms having the structure of said support arms.

12. The device of claim 8 wherein said soil engaging closing wheel has an axis of rotation that is oblique to said slit.

13. The device of claim 8 wherein said soil engaging closing wheel extends across said slit at an oblique angle.

14. The device of claim 8 wherein said soil engaging closing wheel engages the ground surface adjacent said slit to move soil into said slit.

15. The device of claim 8 wherein said soil engaging closing wheel dwells in a plane at an angle with respect to said forward line of travel.

16. The device of claim 15 wherein said soil engaging closing wheel is in a plane that forms an angle with respect to a vertical plane through said slit.

17. The device of claim 15 wherein said soil engaging closing wheel forms an oblique angle with respect to said forward line of travel, and said earth cutting disk forms an opposite angle with respect to said forward line of travel.

18. The combination of a wheel supported liquid manure tank having a rearward end and capable of being moved along a forward line of travel, and a liquid manure soil injection device secured to the rearward end of said tank, comprising, an elongated support arm having forward and rearward ends secured to the rearward end of said tank, a hub on said support arm intermediate the forward and rearward ends thereof, an earth cutting disk rotatably mounted on said hub, and having opposite side surfaces for movement through soil, said earth cutting disk having an axis of rotation which forms both a lateral and vertical angle with respect to said line of travel as to be obliquely positioned when moved forwardly to open an elongated slit in the soil in which said earth cutting disk is moving, and a liquid outlet nozzle on the rearward end of said support arm and being connected to said tank, and being positioned rearwardly of said hub and adjacent said earth cutting disk for delivery of liquid manure into the slit created in the soil by said earth cutting disk.

19. The device of claim 18 wherein a cleaning knife is secured to the rearward end of said support arm and is positioned against one side of said earth cutting disk to clean particles of soil from said disk that may adhere to said disk as said slit is being formed.

20. The device of claim 19 wherein a ground engaging wheel is positioned on the other side of said earth cutting disk opposite to said cleaning knife and engaging said earth cutting disk to clean particles of soil from said earth cutting disk that may adhere to said disk as said slit is being formed.

21. The device of claim 20 wherein said wheel has an axis of rotation parallel to the axis of rotation of said disk.

22. The device of claim 20 wherein said wheel has an outer perimeter with a radially protruding lip, and said lip engages the other side of said earth cutting disk.

23. The device of claim 19 wherein said outlet nozzle is positioned adjacent said cleaning knife.

24. The combination of claim 18 wherein said liquid manure soil injection device comprises a plurality of second support arms having the structure of said support arms.

25. The device of claim 18 wherein the axis of rotation of said earth cutting disk is created by the position of said support arm with respect to said forward line of travel.

26. The device of claim 18 wherein a soil engaging closing wheel is secured to the rearward end of said support arm rearwardly of said earth cutting disk and said nozzle to move soil into said slit as said device is moved in a forwardly direction.

27. The combination of claim 18 wherein a soil engaging closing wheel is secured to the rearward end of said support arm rearwardly of said earth cutting disk and said nozzle to move soil into said slit as said device is moved in a forwardly direction.

28. A liquid manure soil injection device, comprising, an injection support assembly having forward and rearward ends, attachment means on said forward end to secure said support assembly to a liquid manure tank adapted to have a forward line of travel, a hub on said support assembly intermediate the forward and rearward ends thereof, an earth cutting disc rotatably mounted on said hub, and having opposite side surfaces for movement through soil, said earth cutting disc having an axis of rotation which forms both a lateral and vertical angle with respect to said line of travel as to be obliquely positioned when moved forwardly to open an elongated slit in the soil in which said disc is moving, and a liquid outlet nozzle on the rearward end of said support assembly and adapted for connection to said tank and being positioned rearwardly of said hub and adjacent said disc for delivery of liquid manure into the slit created in the soil by said disc.

* * * * *